F. M. EVANS.
AUTOMATIC BRAKE TO PREVENT CARS FROM LEAVING TRACKS.
APPLICATION FILED OCT. 3, 1908.
921,388.
Patented May 11, 1909.
2 SHEETS—SHEET 1.
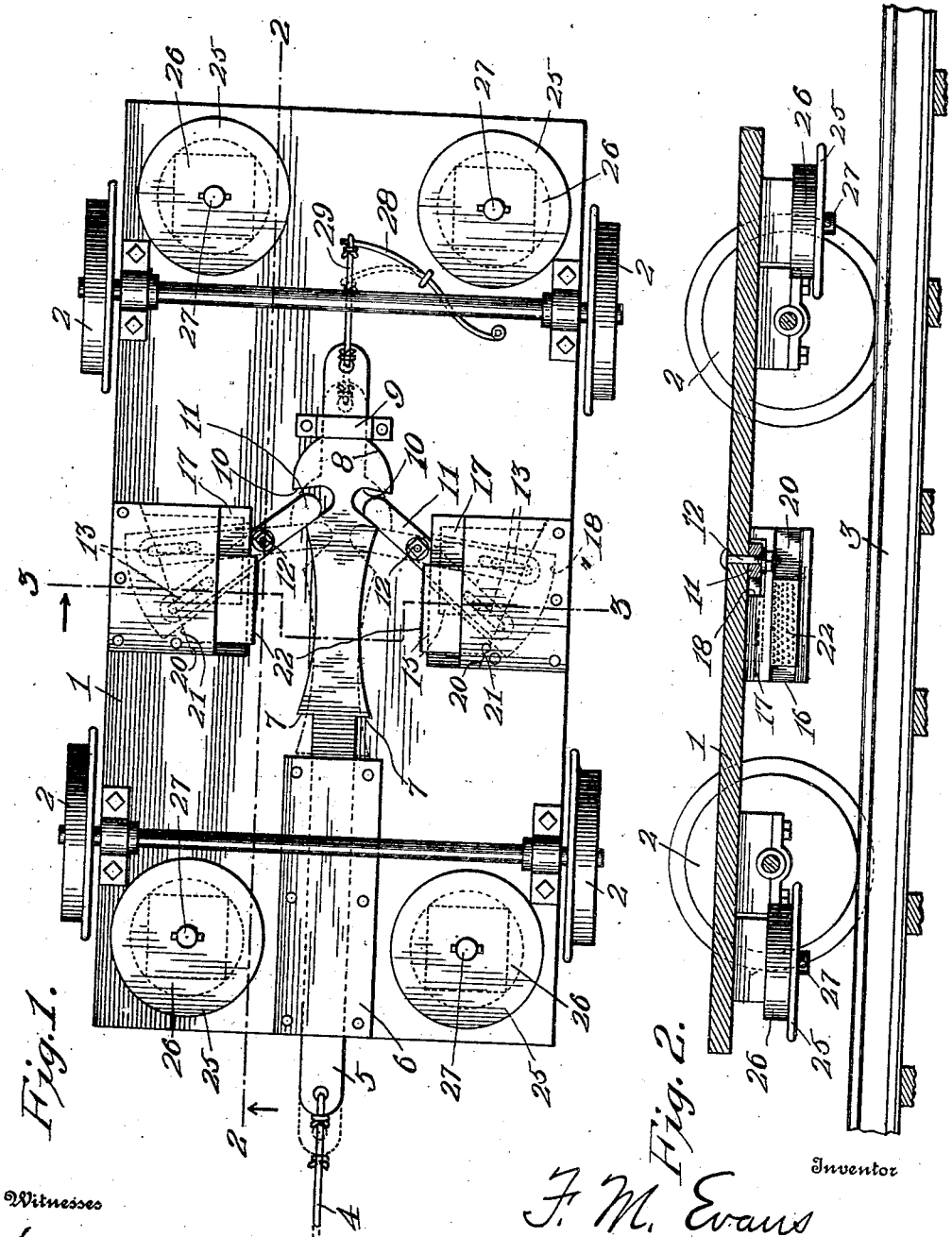

F. M. EVANS.
AUTOMATIC BRAKE TO PREVENT CARS FROM LEAVING TRACKS.
APPLICATION FILED OCT. 3, 1908.
921,388.
Patented May 11, 1909.
2 SHEETS—SHEET 2.
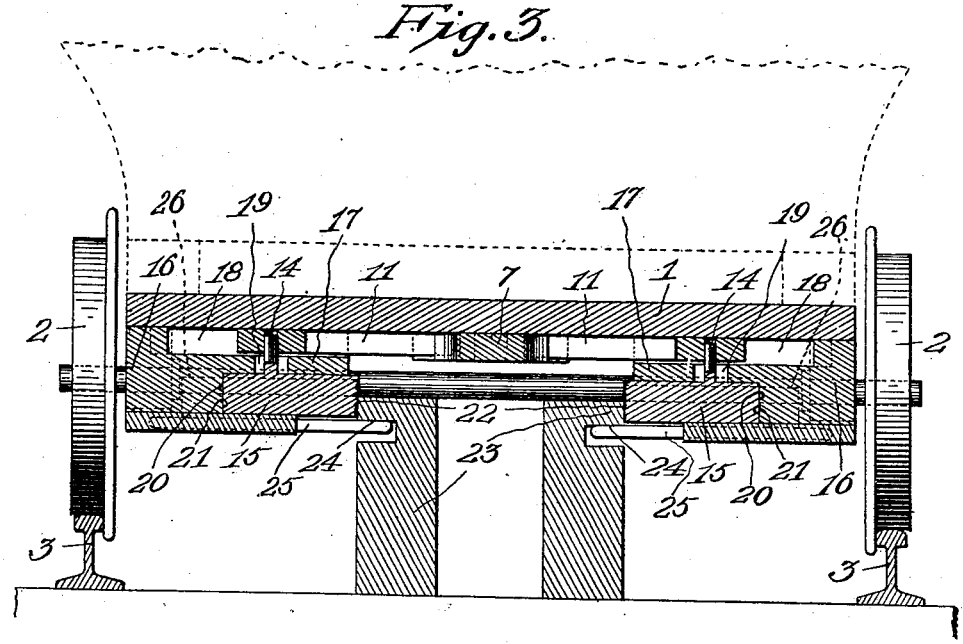
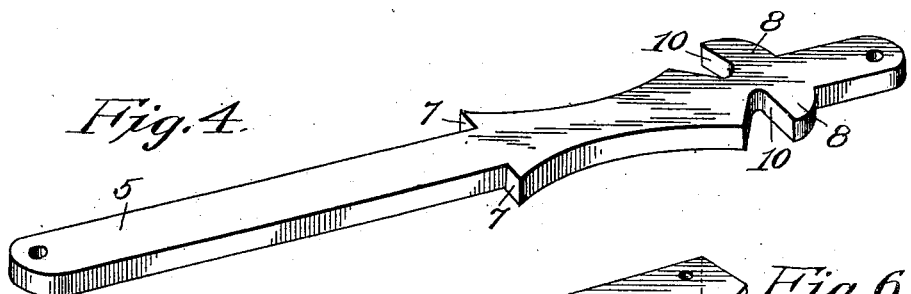
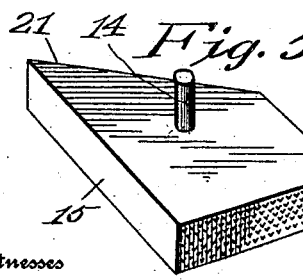
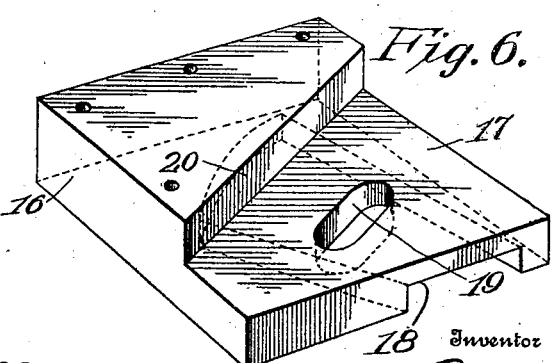
Witnesses
James F. Crown
Nina L. Martin
Inventor
F. M. Evans
By Watson E. Coleman
Attorney

UNITED STATES PATENT OFFICE.

FRANCIS MARION EVANS, OF CAIRNES, KENTUCKY.

AUTOMATIC BRAKE TO PREVENT CARS FROM LEAVING TRACKS.

No. 921,388.     Specification of Letters Patent.     Patented May 11, 1909.

Application filed October 3, 1908. Serial No. 455,940.

*To all whom it may concern:*

Be it known that I, FRANCIS MARION EVANS, a citizen of the United States, residing at Cairnes, in the county of Bell and State of Kentucky, have invented certain new and useful Improvements in Automatic Brakes and Devices to Prevent Cars from Leaving the Tracks, of which the following is a specification, reference being had to the accompanying drawings.

This invention relates to improvements in automatic brakes for vehicles and more particularly to those used on cars which are drawn up and down inclined tracks by means of cables.

The object of the invention is to provide a simple, practical and effective device of this character which will automatically stop the car or vehicle when the cable breaks and thereby prevent the car from running away down the incline.

With the above and other objects the invention consists of the novel features of construction and the combination and arrangement of parts hereinafter fully described and claimed and illustrated in the accompanying drawings, in which—

Figure 1 is a bottom plan view of a car provided with the improved automatic brake; Fig. 2 is a vertical longitudinal section through the same and the track, taken on the plane indicated by the line 2—2 in Fig. 1; Fig. 3 is a vertical cross section indicated by the line 3—3 in Fig. 1; Fig. 4 is a detail perspective of the draw bar; Fig. 5 is a similar view of one of the brake shoes; and Fig. 6 is a similar view of the support and guide for one of the brake shoes.

My improved automatic braking device may be adapted for use on all kinds of railways, but it is more suitable to inclined railways and in the drawings 1 denotes the platform or body of a car or similar vehicle.

2 denotes the ordinary supporting wheels which run upon the track rails 3 and 4 denotes the draft cable which is attached to a draw bar or tongue 5. The latter has its forward portion slidably mounted in a longitudinally disposed guide bearing 6 arranged beneath the forward end of the platform; and the rear end of said bar 5 is formed with stop shoulders 7 to engage the bearing 6, stop shoulders 8 to engage the bearing 9 for the rear extremity of said bar and also with oppositely and angularly disposed recesses 10. These recesses loosely receive the inner ends of two brake shoe levers 11 which are pivoted intermediate their ends at 12 to the bottom of the platform and which have their outer ends slotted as at 13 to receive pins 14 carried by slidably arranged brake shoes 15. These brake shoes are mounted for transverse sliding movement in supporting and guide blocks 16 which are secured to the platform and each of which, as shown in Fig. 6, has a recess 17 to receive the brake shoe and recess 18 to receive one of the levers 11 and a slot 19 to receive one of the pins 14.

One wall of the recess 17 is inclined as shown at 20 to engage a similarly inclined outer end 21 of the brake shoe in order that when the latter is shifted in the recess 17 it will be caused to move in a transverse direction as well as a longitudinal direction. The opposite or inner face of each of the brake shoes is rough as is shown at 22 so as to effectively engage a stationary brake surface formed by the outer face of one or more centrally arranged rails 23. Two of the latter are preferably provided and they are spaced apart so that the cable may drop between them and will be guided and protected thereby. Said rails 23 are arranged between the track rails 3 and in addition to their use as brake rails they serve the further purpose of guide rails since each of them is provided with a shoulder 24 adapted to be engaged by the flanges 25 of guide wheels 26 which are carried by the car. Any number of guide wheels may be provided and they may be arranged in any suitable manner, but as illustrated one is arranged adjacent to each corner of the platform and mounted for rotation on a vertical pivot stud 27 depending from said platform. These guide rails effectively prevent the car from leaving the track. The brake shoes are held normally retracted by the tension upon the cable 4 and they are adapted to be automatically projected inwardly to an operative position or against the center rails 23 when the cable 4 parts, by means of a spring 28 secured at one end to the bottom of the car and having its free end attached to the rear end of the draw bar 5 by means of a connection 29 as shown in Fig. 1.

The operation of the invention will be readily understood by reference to Figs. 1 and 3 of the drawings. When the parts are in normal working order and the cable 4 is under tension the brake shoes are retracted as shown in dotted lines in Fig. 1, but the instant the cable breaks or parts the spring 28 will retract the draw bar 5 and the latter will swing the levers 10 to the full line position shown in Fig. 1. When said levers are thus actuated the brake shoes will be projected inwardly against the combined brake and guide rails 23 owing to the angular disposition of the walls 20 of the guide blocks 16, which walls serve as cam surfaces.

From the foregoing it will be seen that the brake will be entirely automatic in operation and that it will effectively prevent cars running away down their inclined tracks and the accidents usually resulting from the same.

Having thus described my invention what I claim is:

1. The combination with a track and centrally arranged brake surface, of a car to travel on the track, a slidably mounted draw bar, a spring for retracting the latter, brake shoes to engage said brake surface, cam surfaces engaged by said brake shoes, levers pivoted intermediate their ends and loosely engaged with the draw bar, and slot and pin connections between said levers and the brake shoes.

2. The combination with a track, of brake rails arranged between the track rails and having their outer side faces formed with longitudinal grooves, a car to travel on the track, flanged guard wheels arranged on vertical pivots on the car and having their flanges projecting into the grooves in said brake rails, a slidably mounted draw bar upon the car, a spring for retracting the draw bar, slidable brake shoes upon the car and adapted to engage the outer side faces of said brake rails, cam surfaces engaged by said brake shoes, levers pivoted intermediate their ends and loosely engaged with the draw bar and operative connections between said levers and the brake shoes.

In testimony whereof I hereunto affix my signature in the presence of two witnesses.

FRANCIS MARION EVANS.

Witnesses:
   OTIS F. RILEY,
   D. R. JARVIS.